US011002221B2

(12) United States Patent
Griffin

(10) Patent No.: US 11,002,221 B2
(45) Date of Patent: May 11, 2021

(54) ACOUSTIC CAVITY TAILORED SYNTHETIC JET

(71) Applicant: The Boeing Company, Chicago, IL (US)

(72) Inventor: Steven F. Griffin, Kihei, HI (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 15/654,554

(22) Filed: Jul. 19, 2017

(65) Prior Publication Data

US 2019/0024608 A1   Jan. 24, 2019

(51) Int. Cl.
| | |
|---|---|
| *F02K 1/34* | (2006.01) |
| *F04B 45/047* | (2006.01) |
| *F04F 7/00* | (2006.01) |
| *F04F 5/46* | (2006.01) |
| *F04B 43/04* | (2006.01) |
| *B64C 21/04* | (2006.01) |
| *F02K 1/30* | (2006.01) |
| *F15D 1/00* | (2006.01) |
| *F15D 1/08* | (2006.01) |

(52) U.S. Cl.
CPC ............... *F02K 1/34* (2013.01); *B64C 21/04* (2013.01); *F02K 1/30* (2013.01); *F04B 43/046* (2013.01); *F04B 45/047* (2013.01); *F04F 5/46* (2013.01); *F04F 7/00* (2013.01); *F15D 1/007* (2013.01); *F15D 1/0055* (2013.01); *F15D 1/08* (2013.01); *B64C 2230/14* (2013.01)

(58) Field of Classification Search
CPC ... B64C 21/04; B64C 2230/14; F04B 45/047; F04B 43/046; F02K 1/34; F02K 1/30; F15D 1/08; F15D 1/0055; F15D 1/007; F04F 7/00; F04F 5/46
See application file for complete search history.

(56) References Cited

U.S. PATENT DOCUMENTS

| | | | |
|---|---|---|---|
| 5,515,684 A | 5/1996 | Lucas et al. | |
| 6,171,258 B1 * | 1/2001 | Karakasoglu | A61B 5/0205 600/529 |
| 6,353,295 B1 * | 3/2002 | Sridhar | H01L 23/467 315/248 |
| 8,272,851 B2 * | 9/2012 | Lucas | F04B 43/046 239/102.1 |

(Continued)

FOREIGN PATENT DOCUMENTS

| | | |
|---|---|---|
| EP | 2969230 A1 | 1/2016 |
| WO | 2007103384 A2 | 9/2007 |

OTHER PUBLICATIONS

Gallas, Quentin et al "Lumped Element Modeling of Piezoelectric-Driven Synthetic Jet Actuators", University of Florida, AIAA-2002-0125, 2002.

*Primary Examiner* — Peter J Bertheaud
*Assistant Examiner* — Dnyanesh G Kasture
(74) *Attorney, Agent, or Firm* — Felix L. Fischer

(57) ABSTRACT

An acoustic cavity tailored synthetic jet employs a body having a cavity with a wall including a taper from a first extent to an aperture. The cavity is configured to produce a matched acoustic resonance. A drive system has a piston engaged to the cavity at the first extent. The drive system and piston are configured for oscillatory motion inducing a synthetic jet at the aperture.

12 Claims, 18 Drawing Sheets
(3 of 18 Drawing Sheet(s) Filed in Color)

(56) References Cited

U.S. PATENT DOCUMENTS

| | | | |
|---|---|---|---|
| 2007/0163811 A1* | 7/2007 | Gutmark | E21B 10/61 |
| | | | 175/340 |
| 2010/0054973 A1* | 3/2010 | Arik | F04B 43/095 |
| | | | 417/437 |
| 2012/0007469 A1* | 1/2012 | Matova | H01L 41/1136 |
| | | | 310/322 |
| 2013/0336820 A1* | 12/2013 | Griffin | H01L 41/09 |
| | | | 417/415 |
| 2014/0348668 A1* | 11/2014 | Griffin | F04B 43/00 |
| | | | 417/53 |
| 2016/0333871 A1 | 11/2016 | Griffin et al. | |

* cited by examiner

ACOUSTIC CAVITY TAILORED SYNTHETIC JET

BACKGROUND INFORMATION

Field

Embodiments of the disclosure relate generally to the field of synthetic jet actuators and more particularly to an acoustic cavity tailored to maximize total momentum created in a synthetic jet.

Background

Synthetic jets are being employed for control of flow on various aerodynamic surfaces. Boundary layer control for drag reduction to increase fuel efficiency and for aerodynamic controls on flight vehicles as well as turbulence reduction for improved aero-optical performance of electro-optical turrets have been demonstrated with synthetic jets.

A synthetic jet uses a piston to pump a cavity to create a jet without the need for an external air supply. In an exemplary prior art synthetic jet 10 shown in FIG. 1, a piston 12 driven by an input 13 pumps a substantially cylindrical cavity 14 which causes air to move out of an aperture 16. The exiting air (represented by arrows 18) from the cavity 14 forms a jet entraining ambient exterior air whereas the inflowing air (represented by arrows 19) occurs at the sides of the aperture 16. The resulting perceived flow is comparable to a traditional jet.

Prior art attempts to model the behavior of synthetic jets as shown in FIG. 1 assume a Helmholtz resonance for the cavity resonance. This is the same phenomenon that is observed when a tone is heard when blowing over the top of a bottle, and its prediction is easily accomplished with a closed-from model. The strategy employed in the prior art in building a synthetic jet is usually to match the frequency of the acoustic resonance of the cavity with the structural resonance of the piston and to drive one of the two coupled resonances that result when the device is assembled.

SUMMARY

Embodiments disclosed herein provide an acoustic cavity tailored synthetic jet which employs a body having a cavity with a wall including a taper from a first extent to an aperture. The cavity is configured to produce a matched acoustic resonance. A drive system has a piston engaged to the cavity at the first extent. The drive system and piston are configured for oscillatory motion inducing a synthetic jet at the aperture.

The embodiments disclosed provide a method for producing a synthetic jet wherein a cavity is configured to provide a matched acoustic resonance to a structural resonance of a piston and drive system and tailored with a wall tapering from an extent of the cavity proximate to the piston to an aperture. The drive system is operated to induce oscillation of the piston to produce a jet through the aperture.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
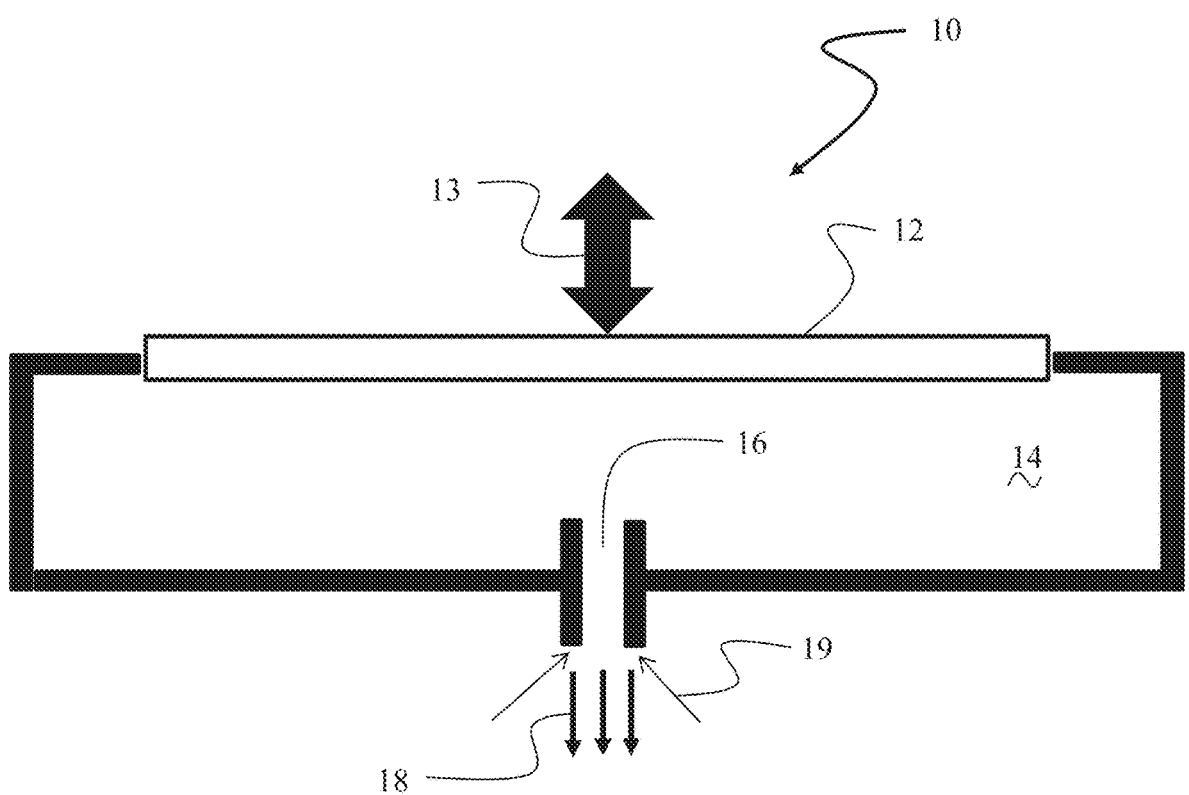
FIG. 1 is a schematic side section view of a prior art structure for a synthetic jet.
Figure 2C:
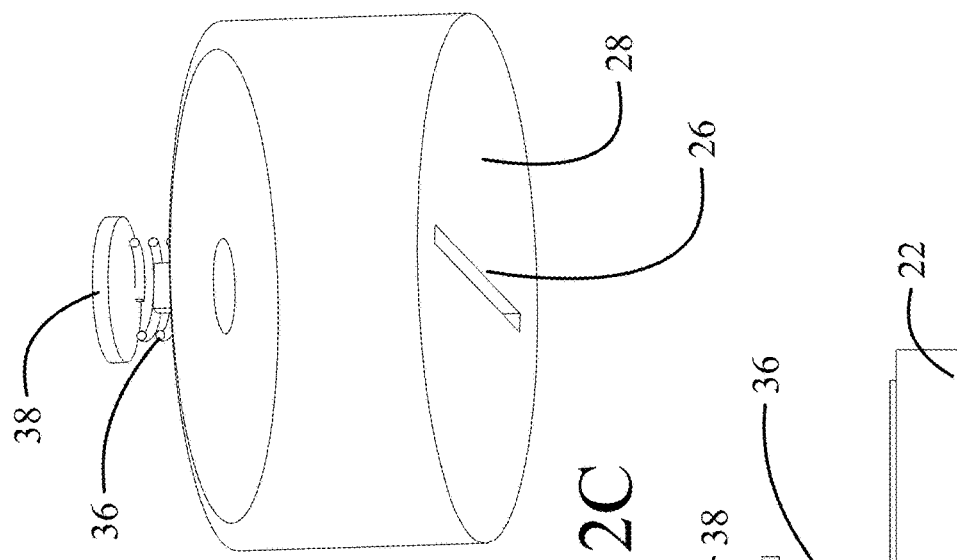
FIG. 2C is a lower pictorial view of the embodiment of FIG. 2A.
Figure 2B:
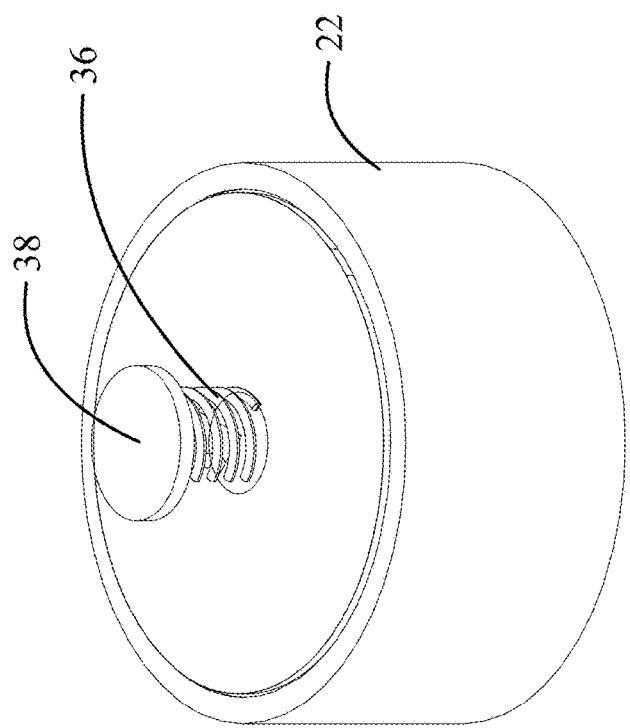
FIG. 2B is an upper pictorial view of the embodiment of FIG. 2A.
Figure 2A:
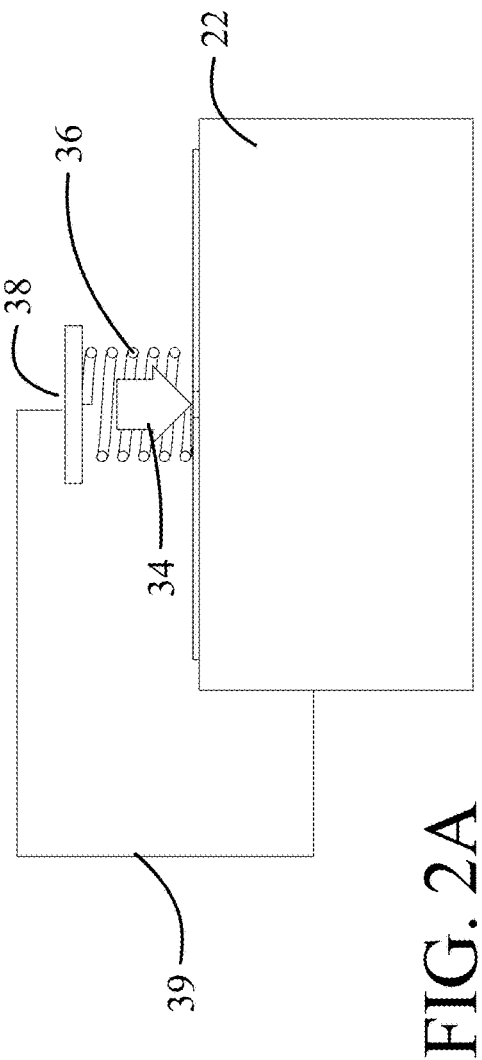
FIG. 2A is representation of an implementation of a current conical embodiment.

Embodiments disclosed herein provide improved performance in the momentum output of synthetic jets to increase their effectiveness. A tapering cavity is employed which is tuned to match a resonant frequency of a piston employed to pump the cavity. A drive system, such as a piezo electric actuator, is used with added or integral resilient elements to actuate the piston. An uncoupled resonant frequency of the piston is reduced by decreasing stiffness in the drive system. In an exemplary embodiment as will be described below, reduction in the uncoupled resonant frequency by a factor of two by decreasing spring stiffness by a factor of four results in a doubling of total momentum of the jet compared to synthetic jet employing a conventional Helmholtz resonator.

Referring to the drawings, FIGS. 2A-2C and 3 illustrate a first embodiment for an acoustic cavity tailored synthetic jet 20. A body 22 houses the cavity 24 and an aperture 26 in a lower surface 28 of the body provides an outlet for the jet. For certain embodiments, the aperture 26 is a slot. However, alternative embodiments may employ a circular or alternate shape for the aperture. A piston 30 sized to be received and oscillate in an upper extent of the cavity is actuated by a drive system 32 including a forcing element 34, which may be a piezo electric actuator or similar device, and a resilient element, a spring 36 for the embodiment shown. For purposes of description herein, the end of the spring 36 that is not connected to the piston 30 is rigidly connected to a structural ground 38. The cavity dimensions are tuned for an acoustic resonance to match the resonant frequency of the piston and drive system. The body 22 housing the acoustic cavity 24 and the structural ground are rigidly interconnected as represented by interconnection 39.

Figure 3:
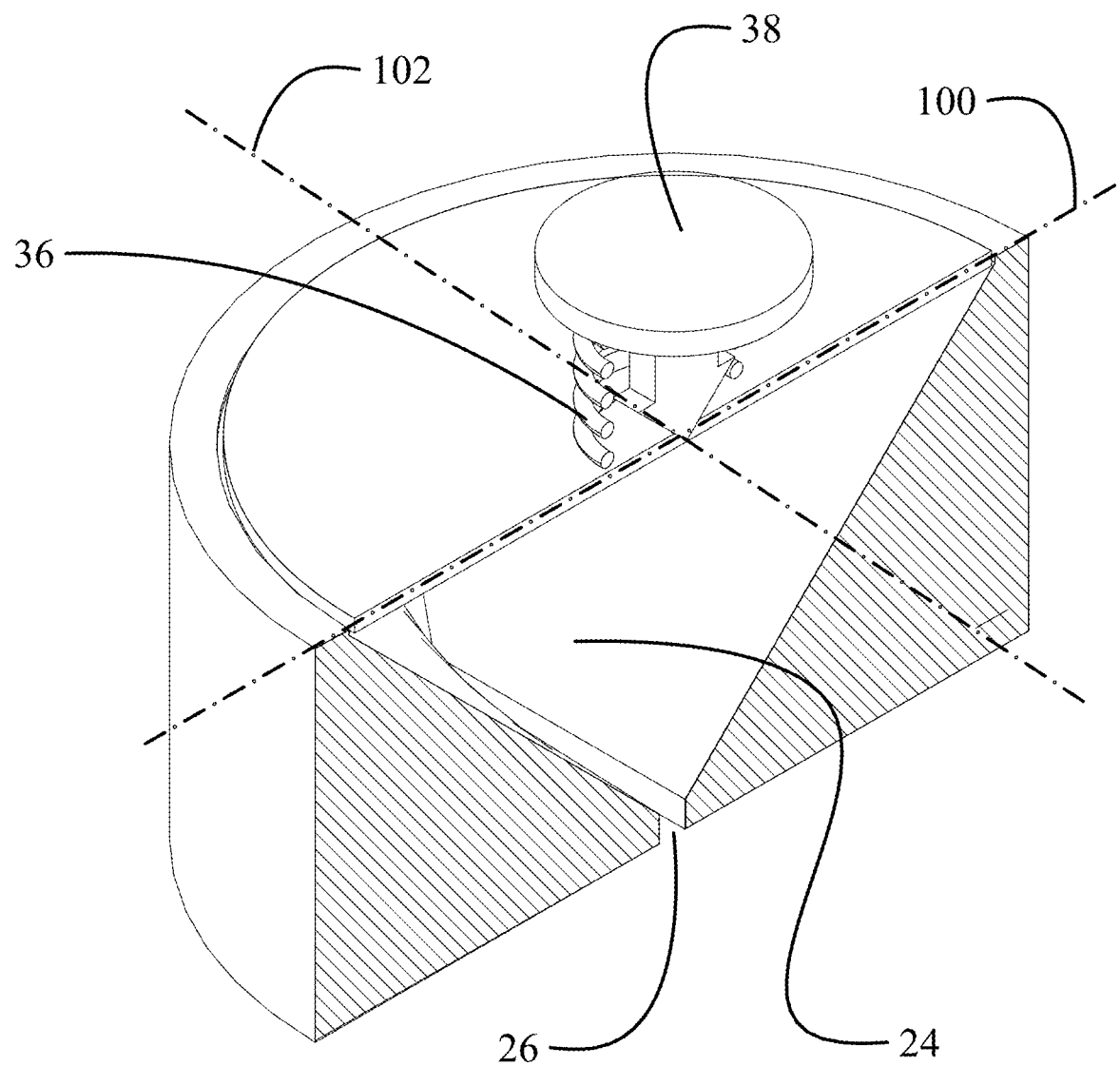
FIG. 3 is an isometric sectioned view of the embodiment of FIG. 2A.
Figure 4A:
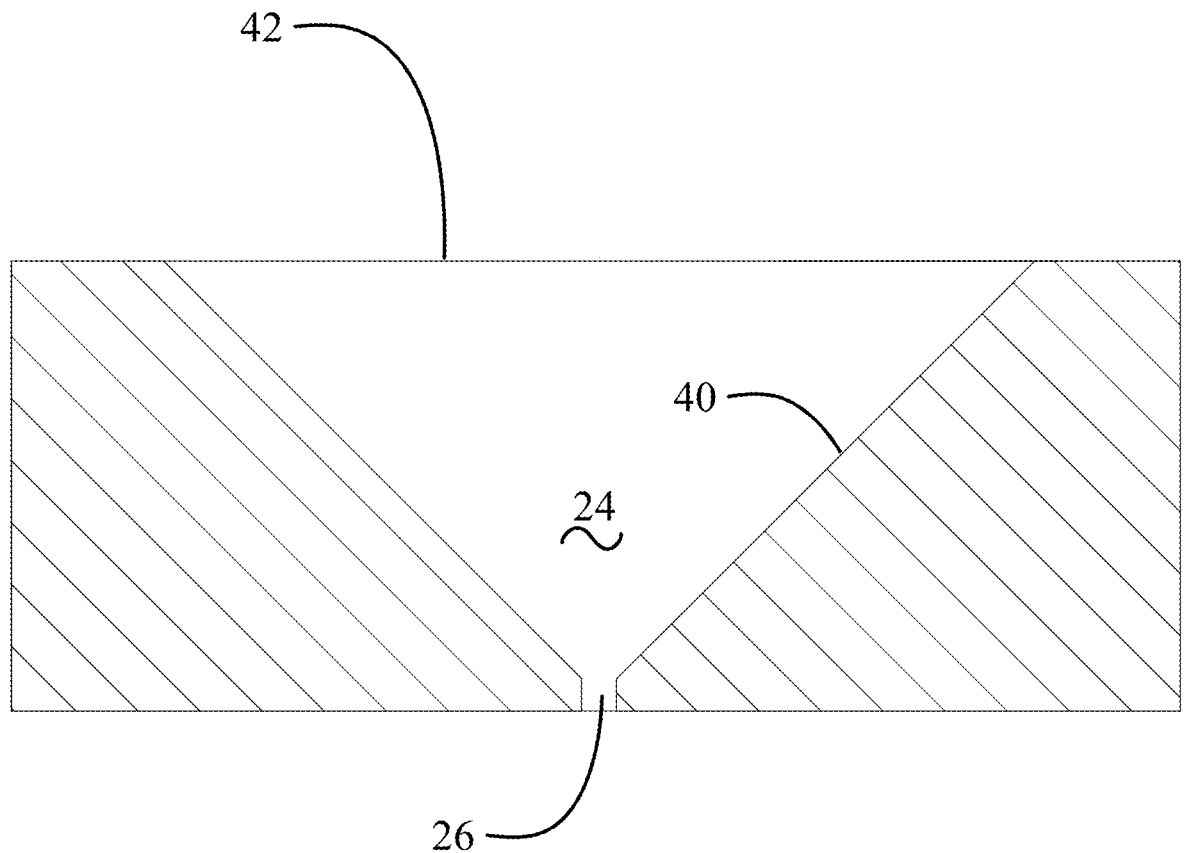
FIG. 4A is a section view a lateral axis of FIG. 3.
Figure 4B:
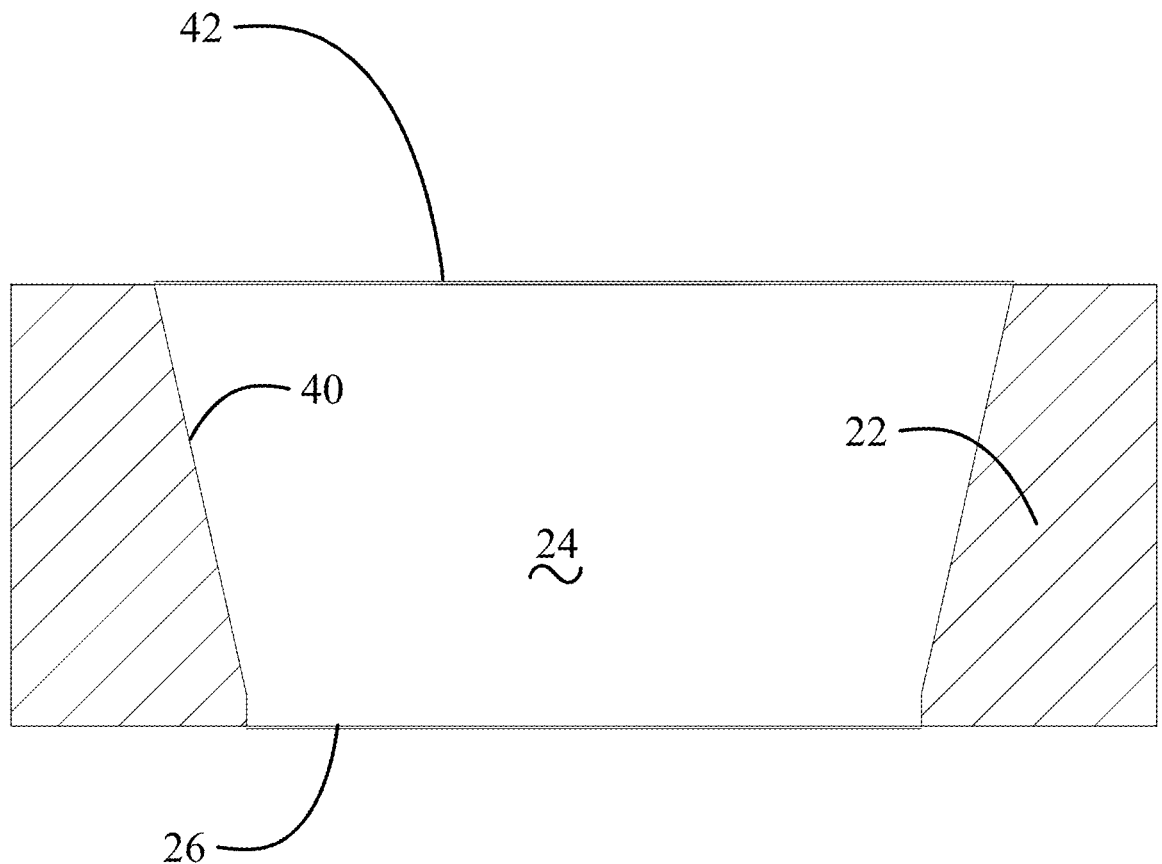
FIG. 4B is a section view along a longitudinal axis of FIG. 3.
Figure 5:
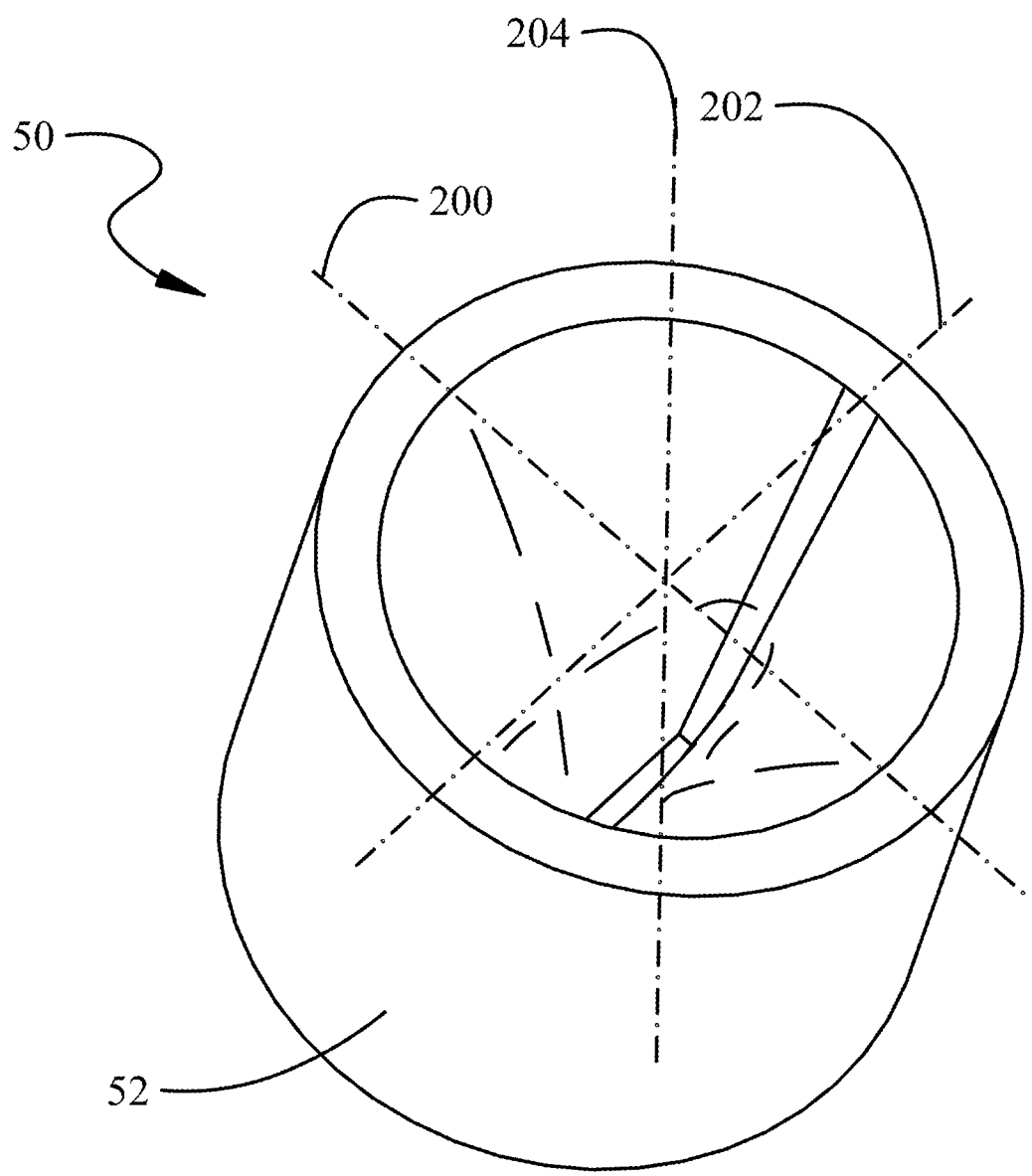
FIG. 5 is an upper pictorial view of a second embodiment without the piston for clarity.

As seen in FIGS. 3 and 4A-4B, the wall 40 of the cavity 24 has an opening taper from the aperture 26 to an upper extent 42. For the embodiment of FIGS. 2A-4B, the taper of the wall 40 is substantially linear from the upper extent to the rectangular slotted aperture 26. For a circular aperture the taper is conical. For the exemplary embodiment shown in FIGS. 4A and 4B, the slope of the taper in the plane of lateral axis 100 is approximately 1/1 as seen in FIG. 4A. In a plane of the longitudinal axis 102 (parallel to the slot) the slope of the taper is approximately 5/1 as seen in FIG. 4B.

Figure 6:
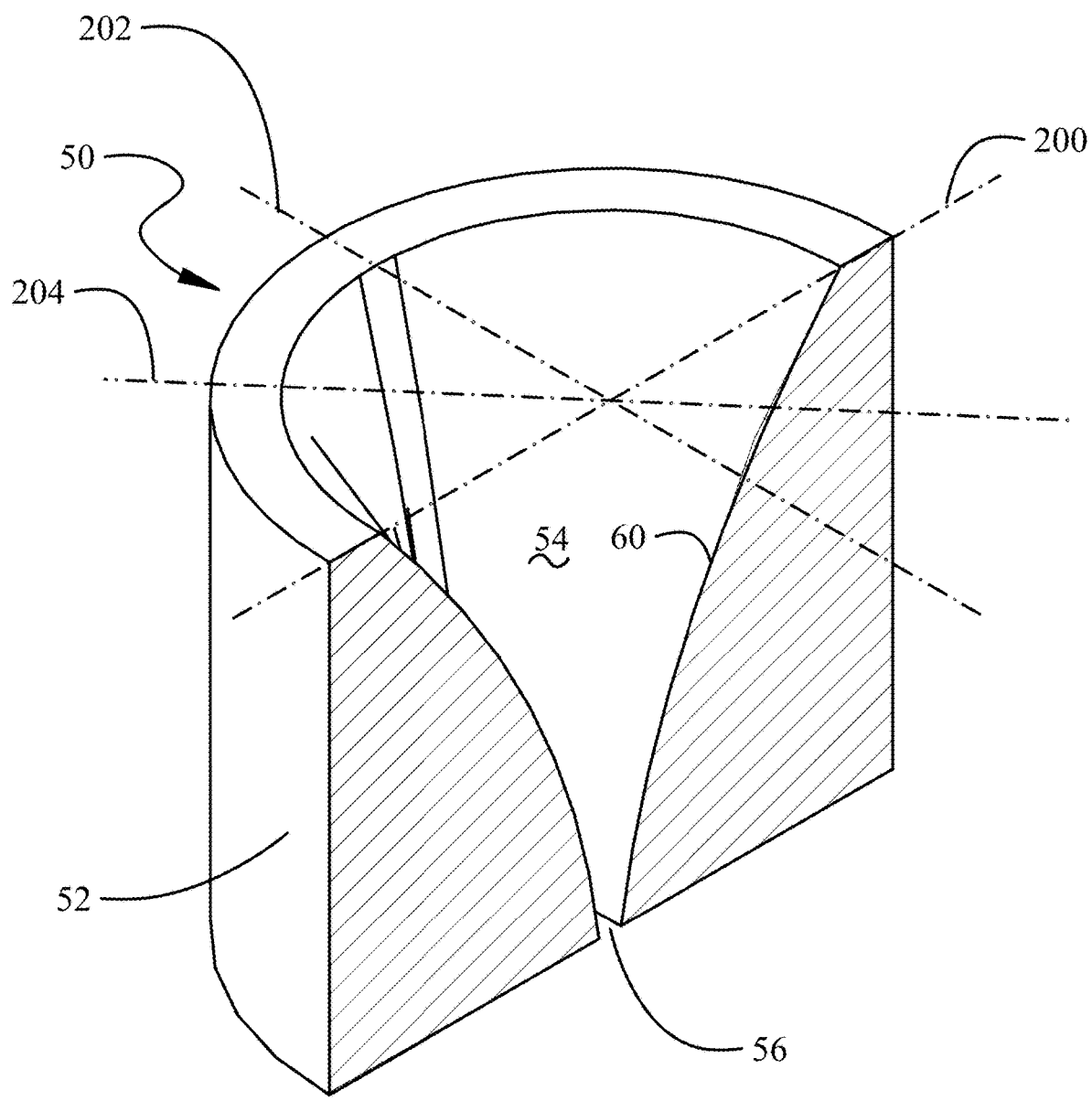
FIG. 6 is an isometric sectioned view of the embodiment of FIG. 5 along line FIG. 6 of FIG. 5.
Figure 7A:
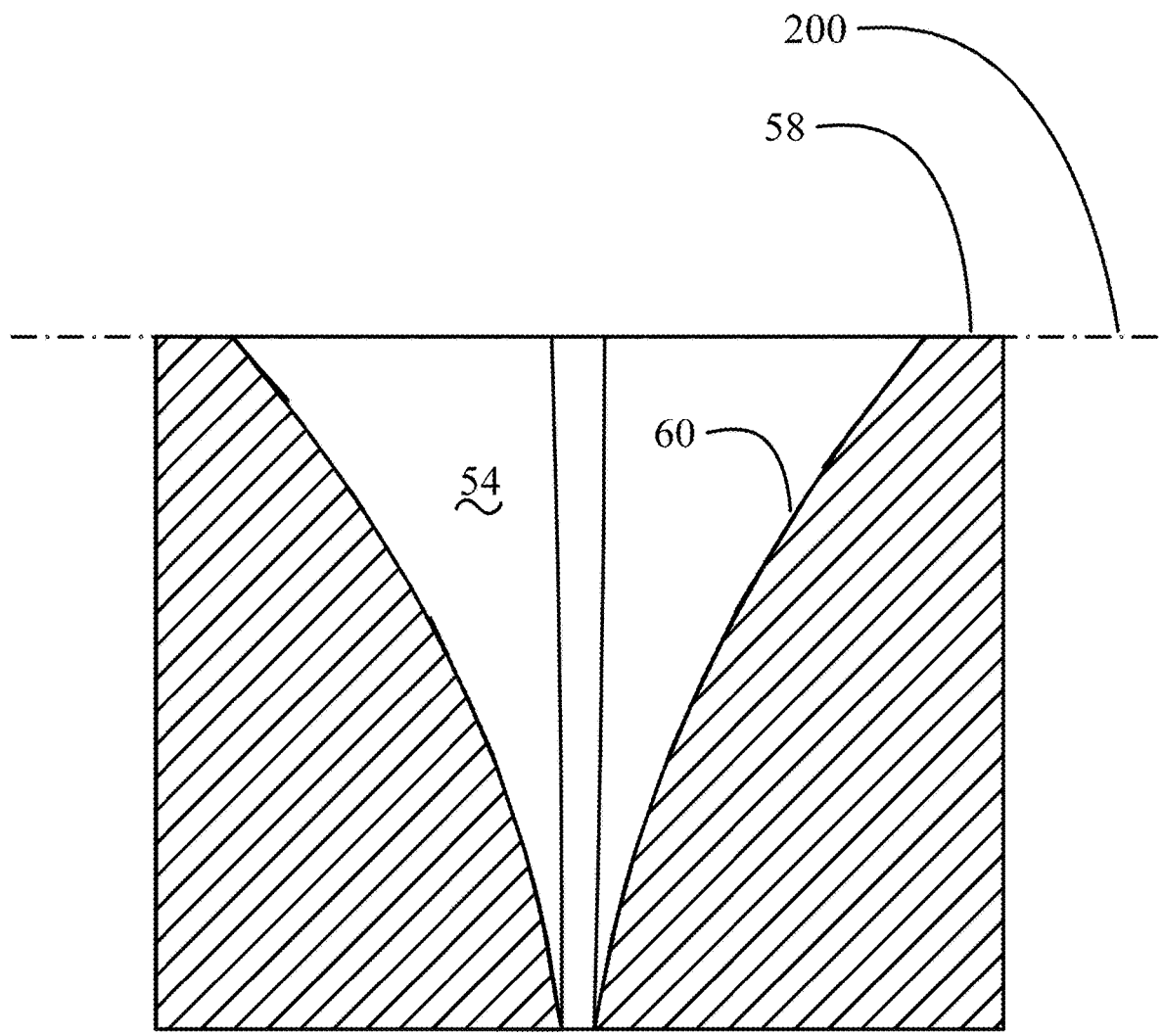
FIG. 7A is a section view along a lateral axis of FIG. 5.
Figure 7B:
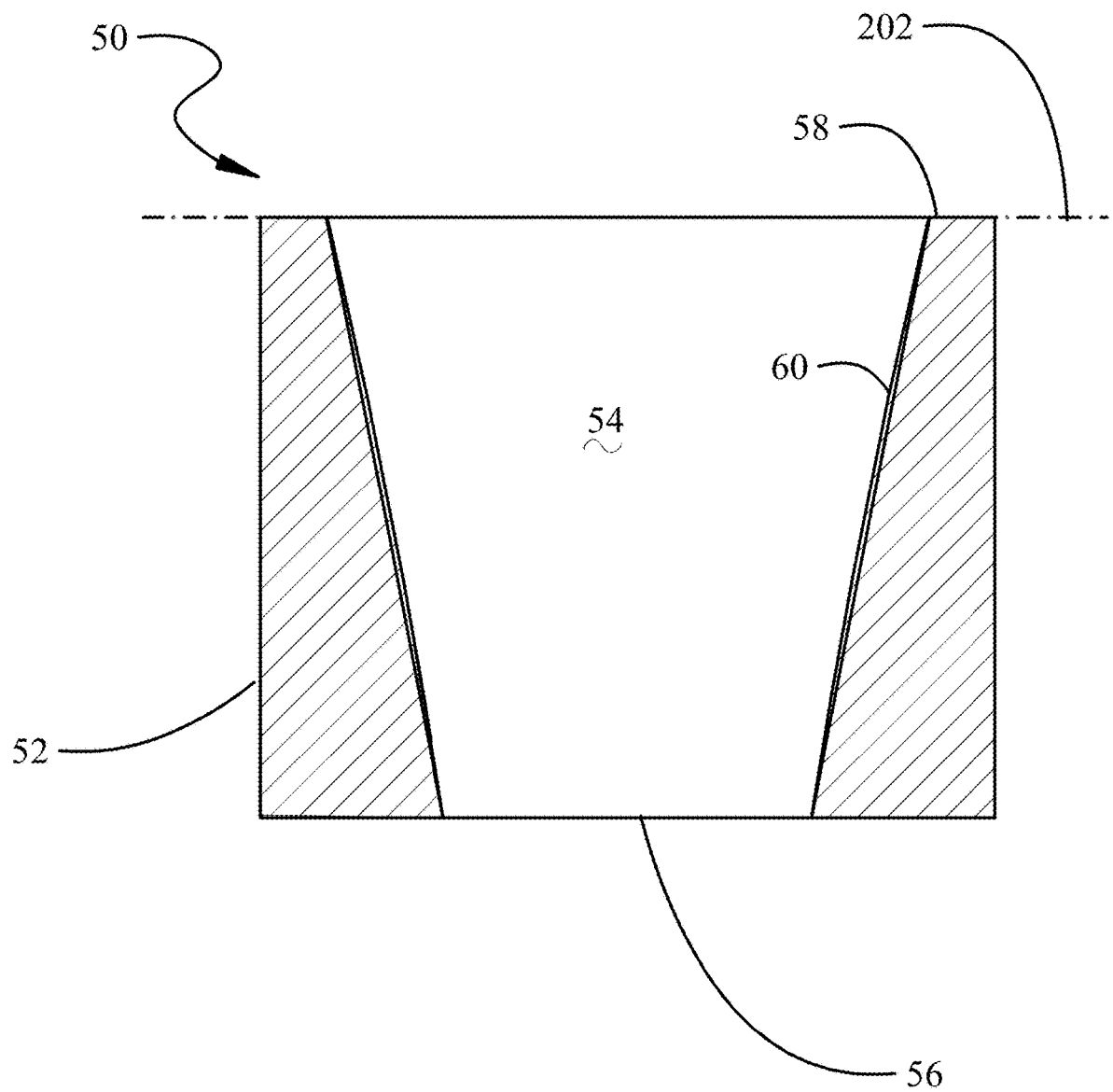
FIG. 7B is a section view along a longitudinal axis of FIG. 5.
Figure 7C:
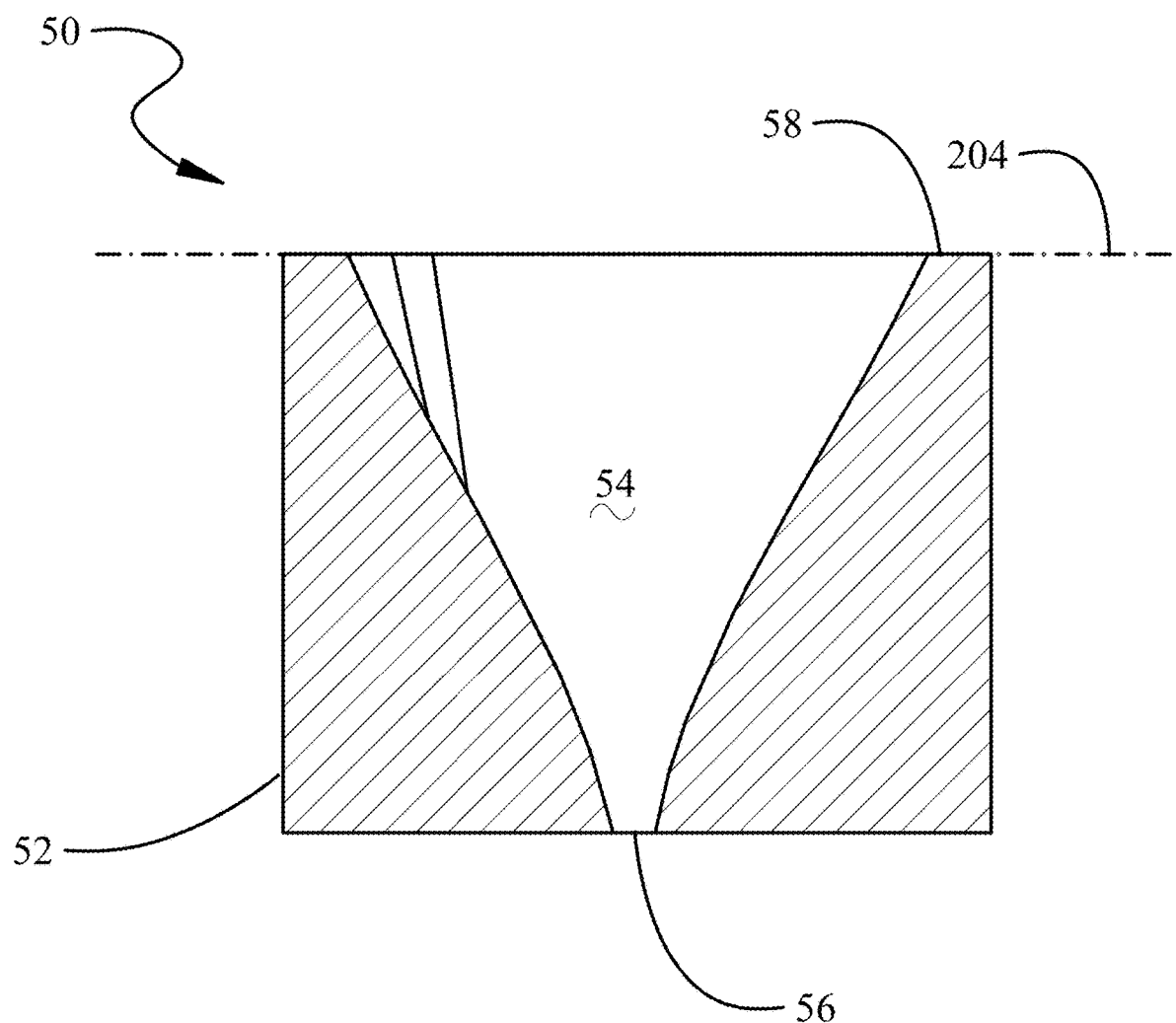
FIG. 7C is a section view along an intermediate axis of FIG. 5.

A second embodiment for the acoustic cavity tailored synthetic jet 50 having a body 52 with a more radical non-linear taper in the cavity 54 is seen in FIGS. 5-7C (the drawings are not to scale and are dimensionally exaggerated representations for clarity). The piston and drive system are substantially identical to piston 30 and drive system 32 as described for the first embodiment. The taper in the second embodiment is shaped, similar to the bell of a brass instrument such as a trumpet, as seen in FIG. 6 which is a perspective section view along a lateral axis 200. The taper of the wall 56 of cavity 54 varies with progressively increasing slope from the upper extent 58 of the cavity to the aperture 56 as best seen in FIG. 7A, a section along the lateral axis 200. In the plane of the longitudinal axis as seen in FIG. 7B, the slope of the taper is also varying but rapidly becomes asymptotoic approaching the aperture. As seen in FIG. 7C, in intermediate regions between the lateral and longitudinal axes, the slope of the wall 60 increases between the upper extent 58 and aperture 56. As in the prior embodiment, the cavity dimensions of the tapered second embodiment are tuned for an acoustic resonance to match the resonant frequency of the piston and drive system. The taper is then further adjusted to provide a pressure distribution mode shape having highest pressure at the piston face.

Figure 7D:
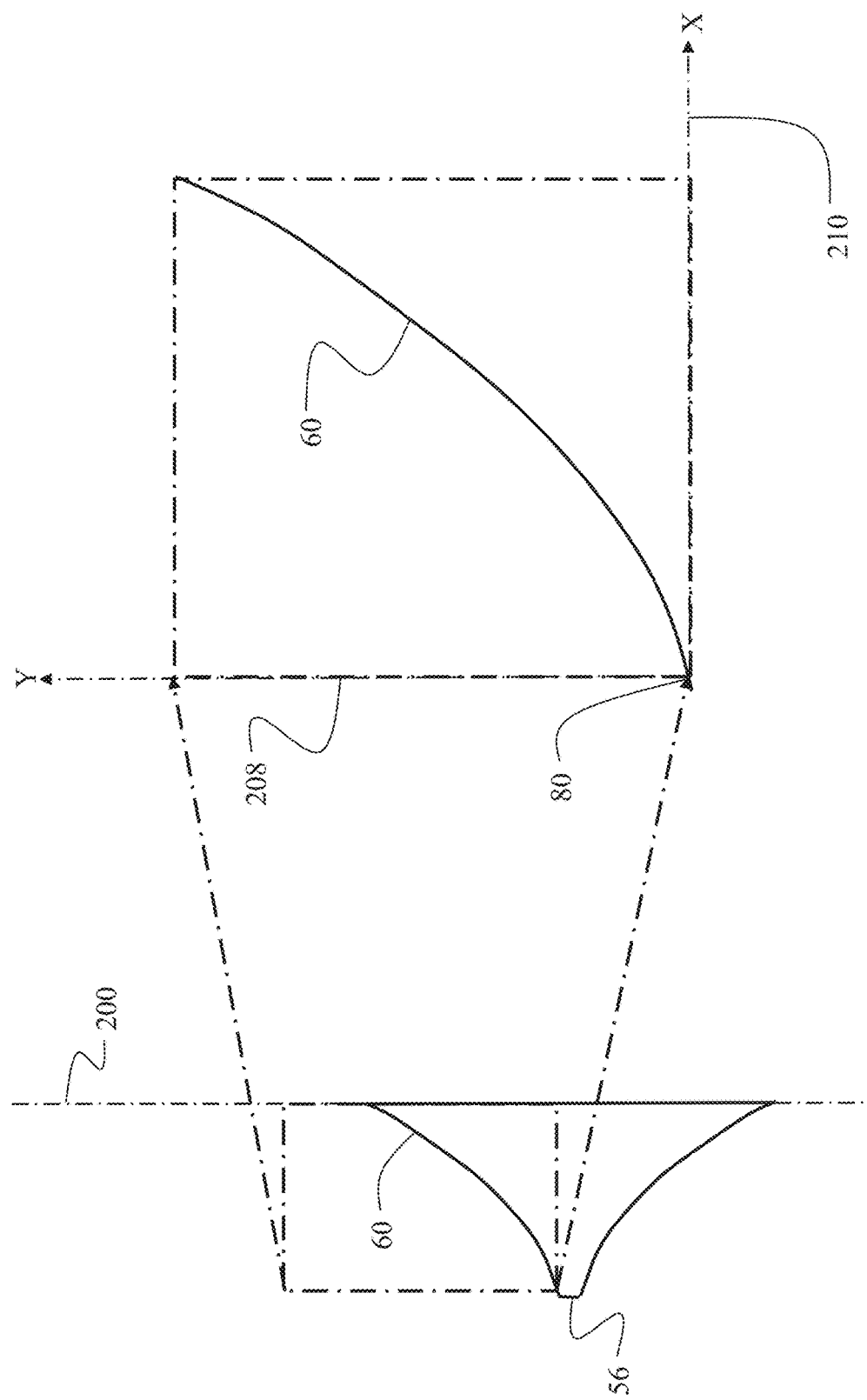
FIG. 7D is an expanded section view for exemplary curve fitting for a taper comparable to that represented in FIG. 7A.
Figure 8:
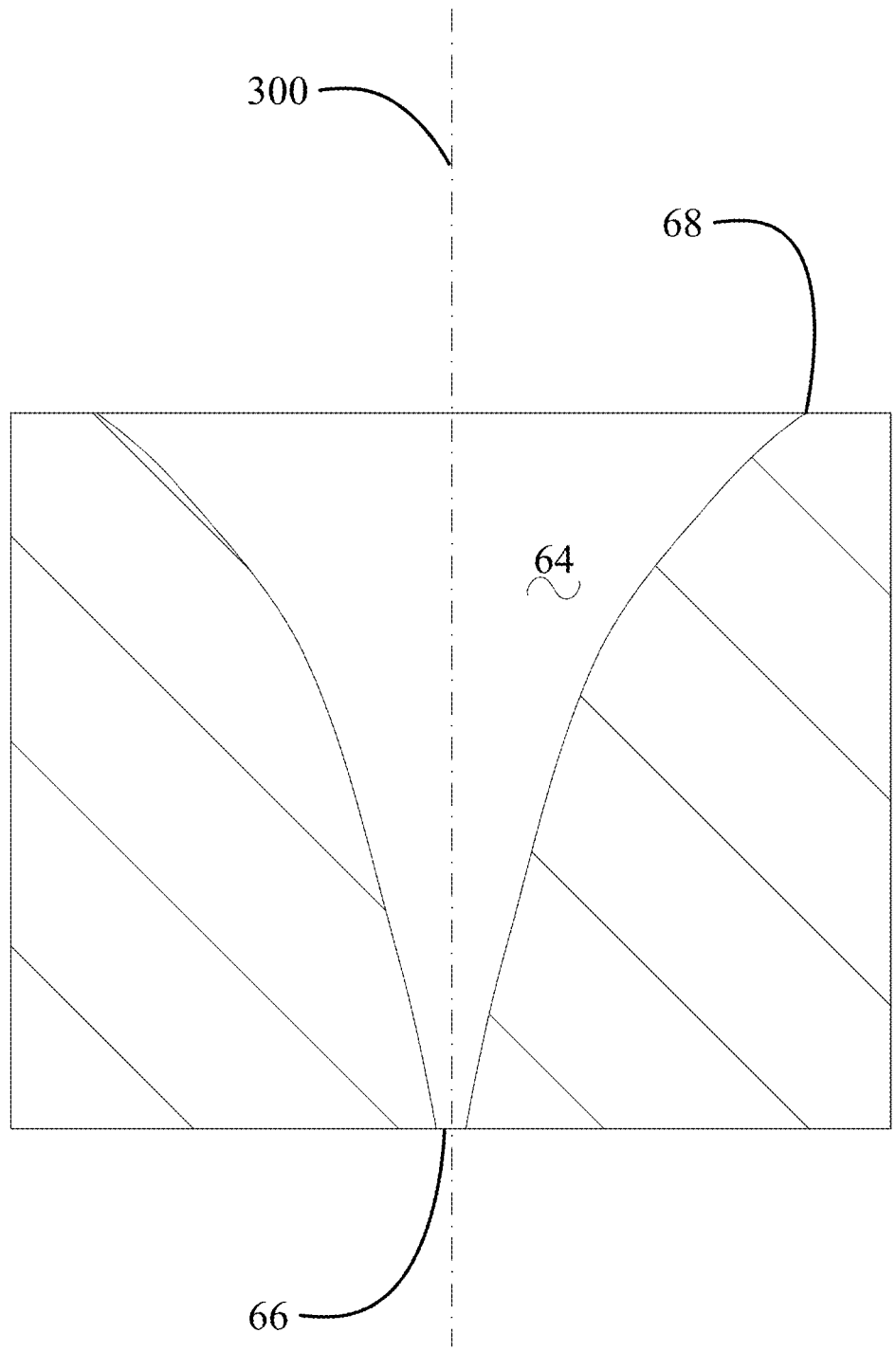
FIG. 8 is a side section view of a symmetrical embodiment with a circular aperture.

For the exemplary embodiment of FIGS. 6 and 7A-7C, the shape of the tapered wall 60 in the section along the lateral axis 200 has been determined by non-dimensionalized curve fitting to substantially match $y=5.167x^4-7.413x^3+4.680x^2-1544x+0.00422$ as shown in FIG. 7D with the Y axis 208 parallel with the lateral axis 200 and the X axis 210 tangent to the wall surface at the edge 80 of the slot comprising aperture 56 and perpendicular to the lateral axis 200. To achieve the desired curvature, the shape of the tapered wall for exemplary embodiments may be characterized as a polynomial of at least second order thereby providing a varying slope characterized by a polynomial of at least first order.

For a circular aperture 66, a version of the second embodiment provides a cavity 64 that is symmetrical about a perpendicular axis 300 through a center of the aperture. A wall 70 of the cavity 64 has a taper with an increasing slope from an upper extent 68 to the aperture 66.

While the body 22, 52 of the described embodiments is shown as a separate entity, the body may be incorporated as a portion of or attached to a surface or structure from which the jet flows. Additionally, while shown and described with a flat plate piston, the piston 30 may be a diaphragm engaged at its periphery to the proximal extent 48, 58) of the cavity (24, 54).

Figure 9A:
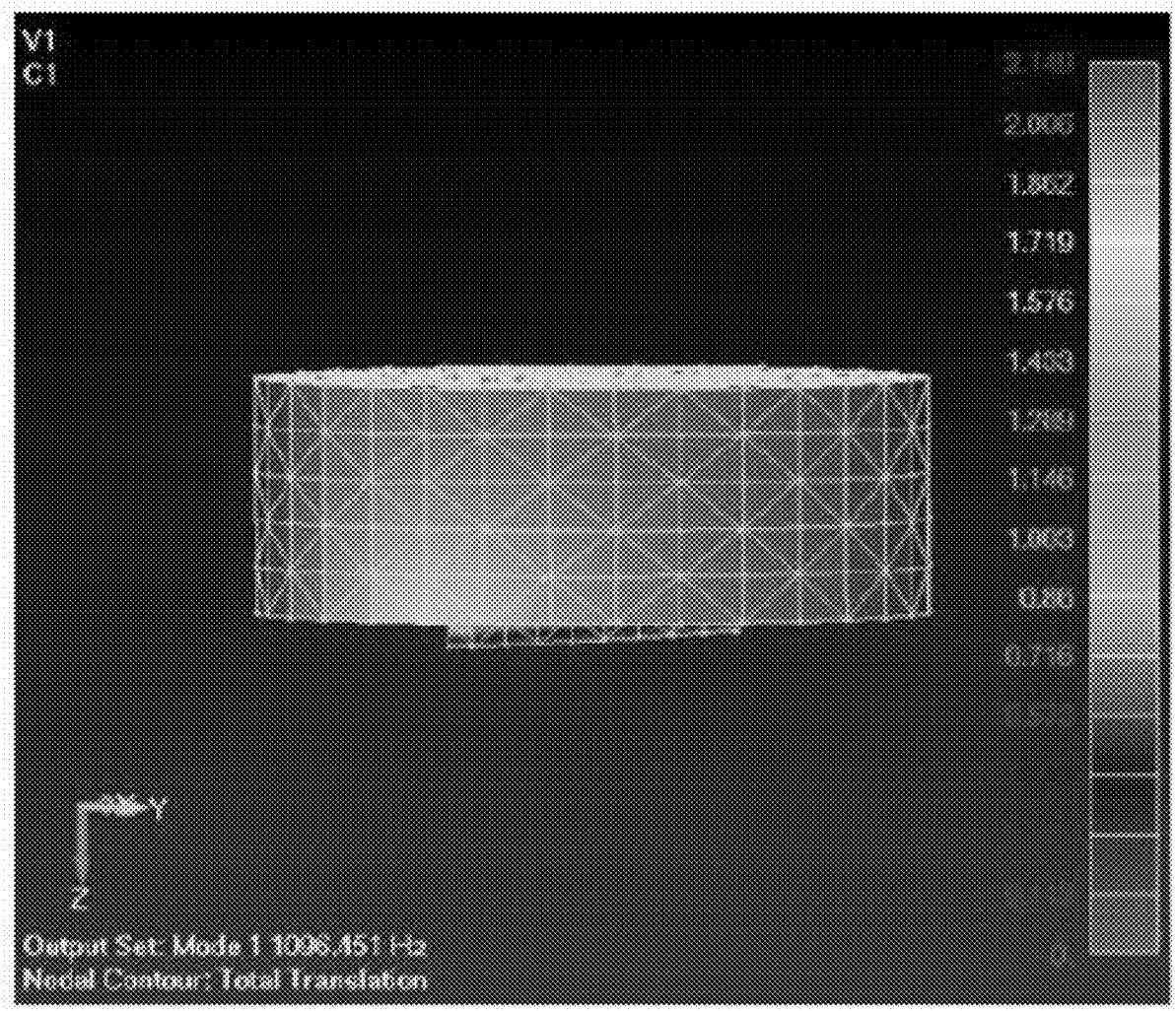
FIG. 9A is a representation of the cavity for a prior art cylindrical cavity.
Figure 9B:
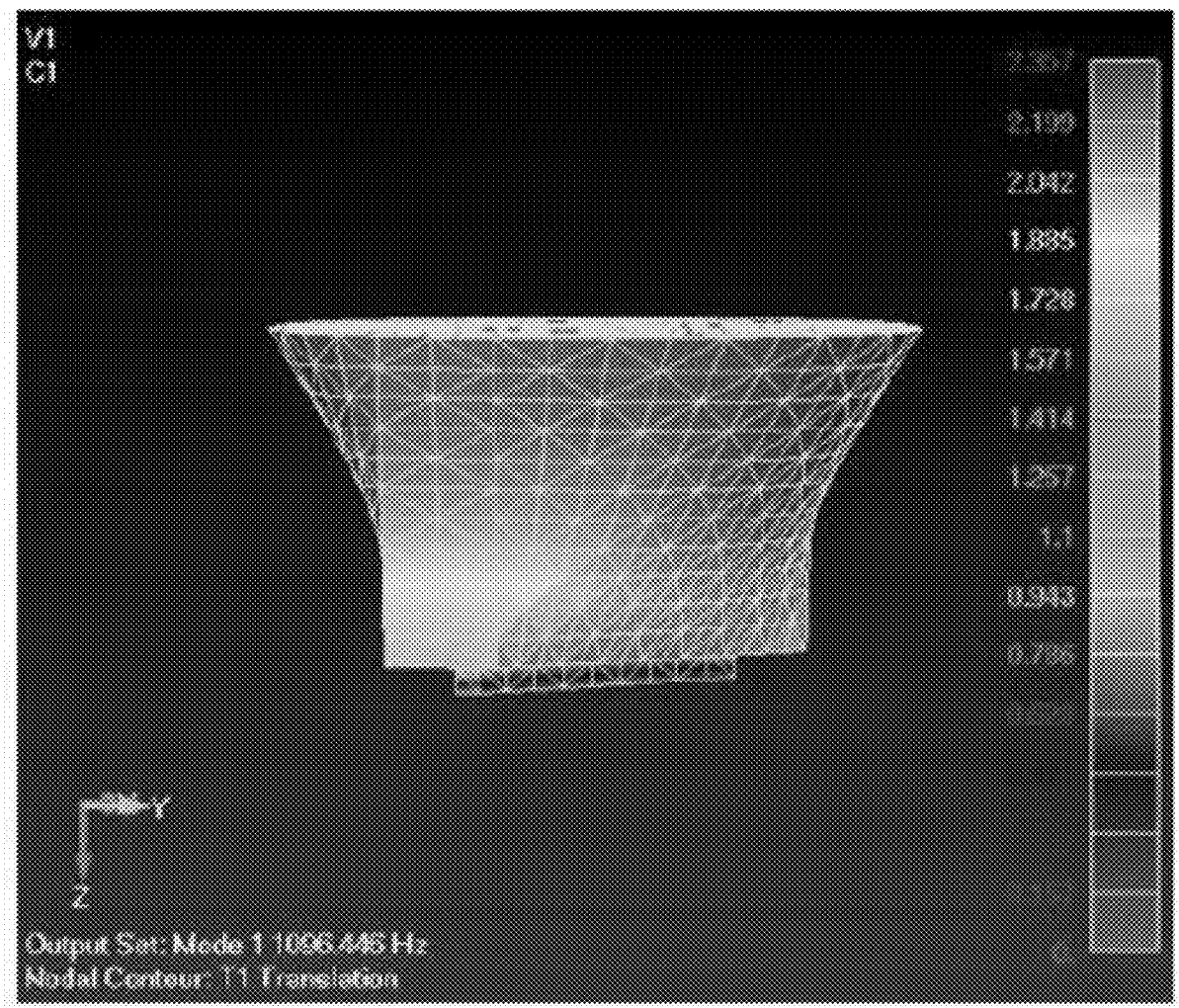
FIG. 9B is a representation of the cavity for the embodiment of FIG. 2.
Figure 9C:
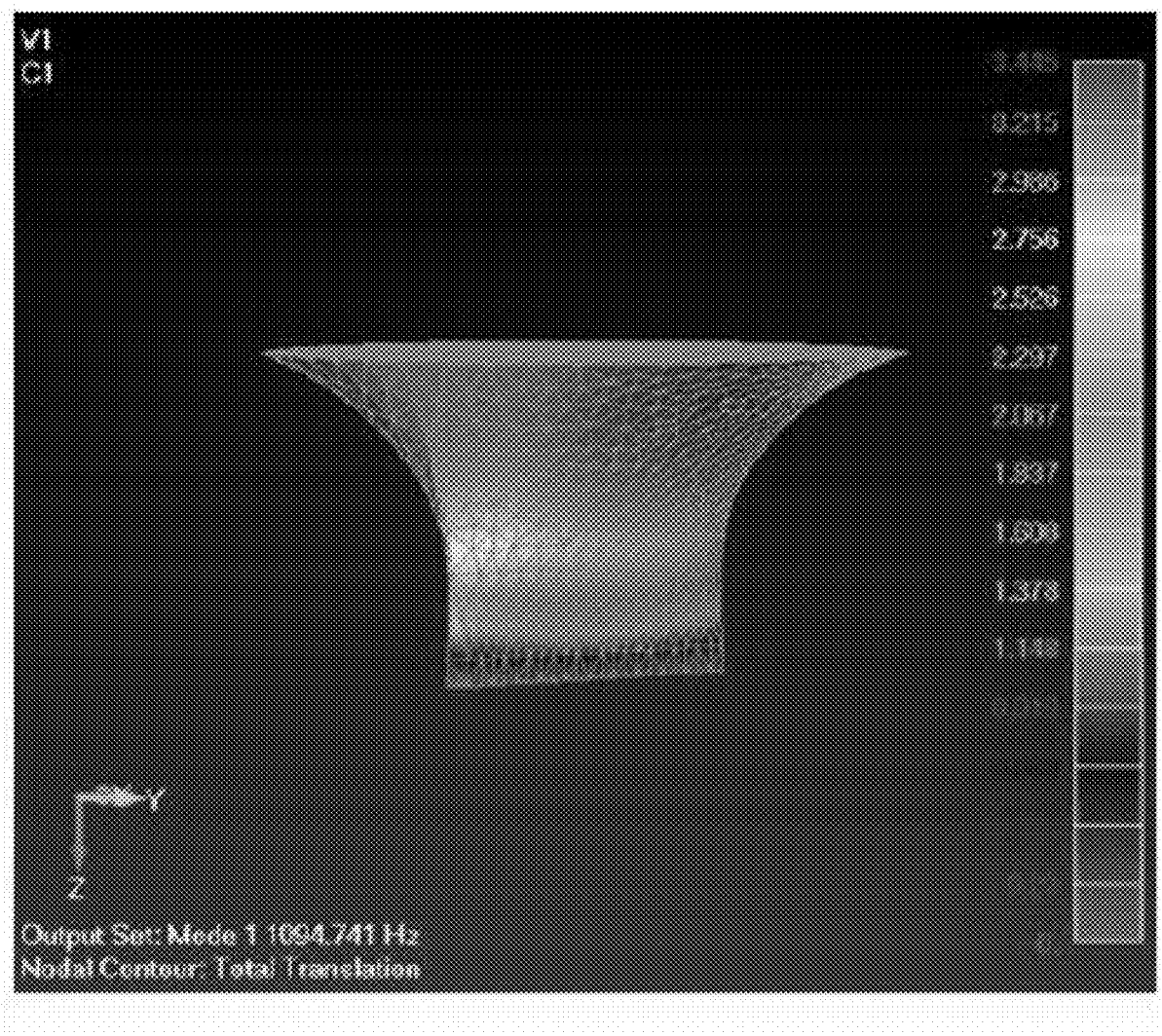
FIG. 9C is a representation of the cavity for the embodiment of FIG. 5.

FIGS. 9A-9C provide a comparison of pressure concentration associated with the first acoustic mode shape between a prior art cylindrical cavity (FIG. 9A), a linear tapered cavity (FIG. 9B) as described with respect to FIGS. 2A-4B above and a cavity with varying slope (FIG. 9C) as described with respect to FIGS. 5-7C above. FIG. 9A demonstrates a pressure amplitude in the cavity which is uniform as in the Helmholtz resonator. The cavity as seen in FIG. 9B shows that tapering the cavity as it progresses from the extent proximate the piston (distal from aperture) to the slotted aperture results in an acoustic mode with a higher pressure concentration near the piston. Finally, the cavity as seen in FIG. 9C shows the most concentrated pressure at the proximal extent of the cavity on the back of the piston and the most "aggressive" taper. In combination with the tapering of the cavity wall, the drive system 32 for the described embodiments is configured to allow reducing the uncoupled resonant frequency of the piston to provide an amplifying effect for the total momentum of the produced jet.

The exemplary taper for the cavity 54 is characterized as producing the same uncoupled natural frequency as a cylindrical cavity with a first acoustic mode shape pressure distribution having highest concentration at the extent proximate the piston 30. Total momentum is proportional to the square of velocity divided by the frequency. Since total momentum is inversely proportional to frequency, decreasing the frequency of the coupled system increases total momentum when there is good coupling between the acoustic cavity and the mechanical piston and drive system. The shape of the cavity (in the disclosed embodiment the taper of the cavity) determines the coupling.

As seen in Table 1, reduction of the uncoupled resonant frequency of the piston 30 by a factor of 2 accomplished by decreasing stiffness of the spring 36 by a factor of 4 results in an increase of normalized momentum of the jet with a tapering wall cavity of FIG. 9B and an effective doubling of calculated normalized momentum for the cavity with the varying increasing slope taper of FIG. 9C.

TABLE 1

| | Calculated normalized momentum | |
|---|---|---|
| Cavity shape | Matched frequency normalized total momentum | Half structural frequency normalized total momentum |
| FIG. 9A | .51 | .49 |
| FIG. 9B | .51 | .58 |
| FIG. 9C | .55 | 1.0 |

Figure 10A:
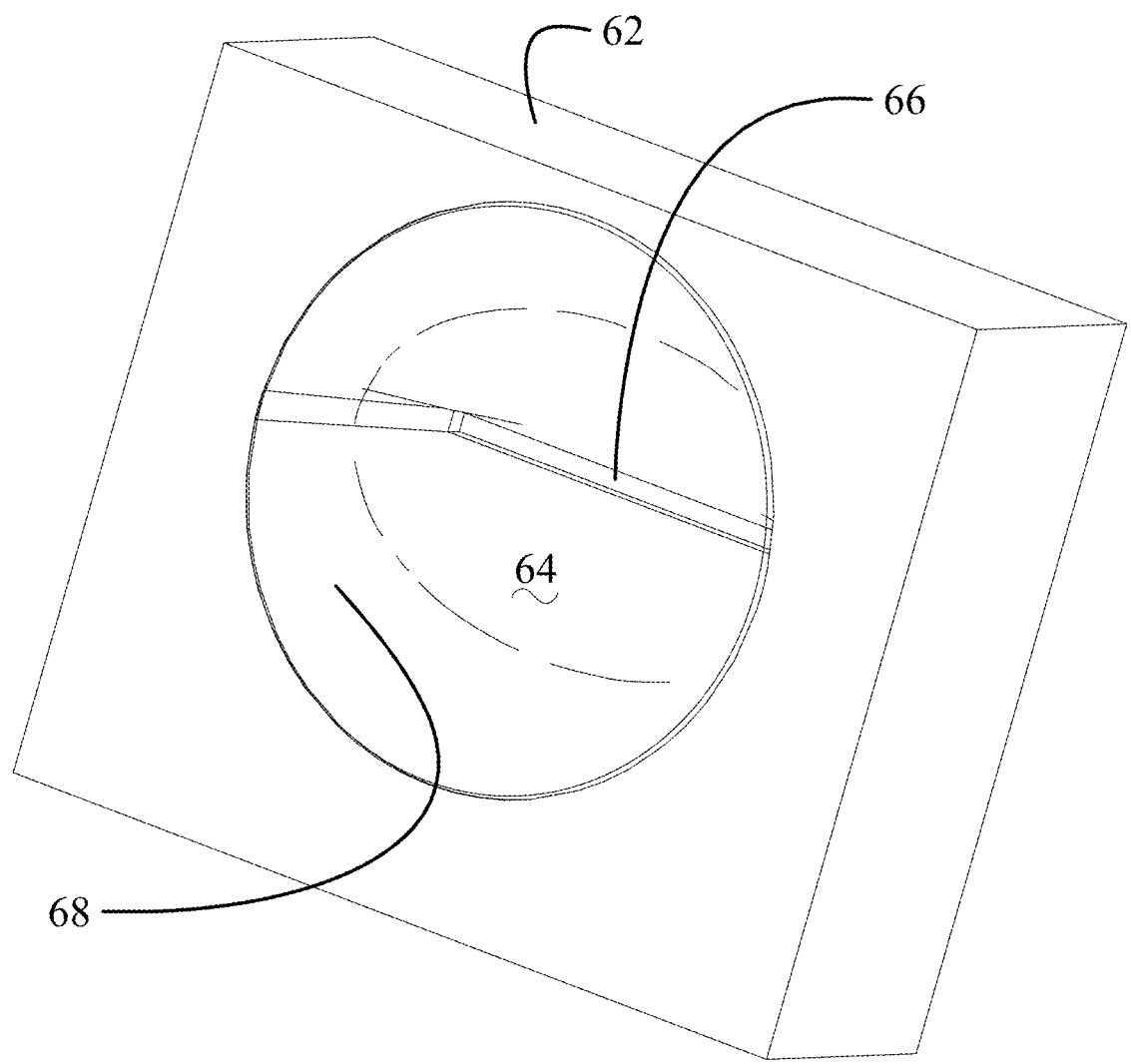
FIG. 10A is a pictorial representation of a structural embodiment.
Figure 10B:
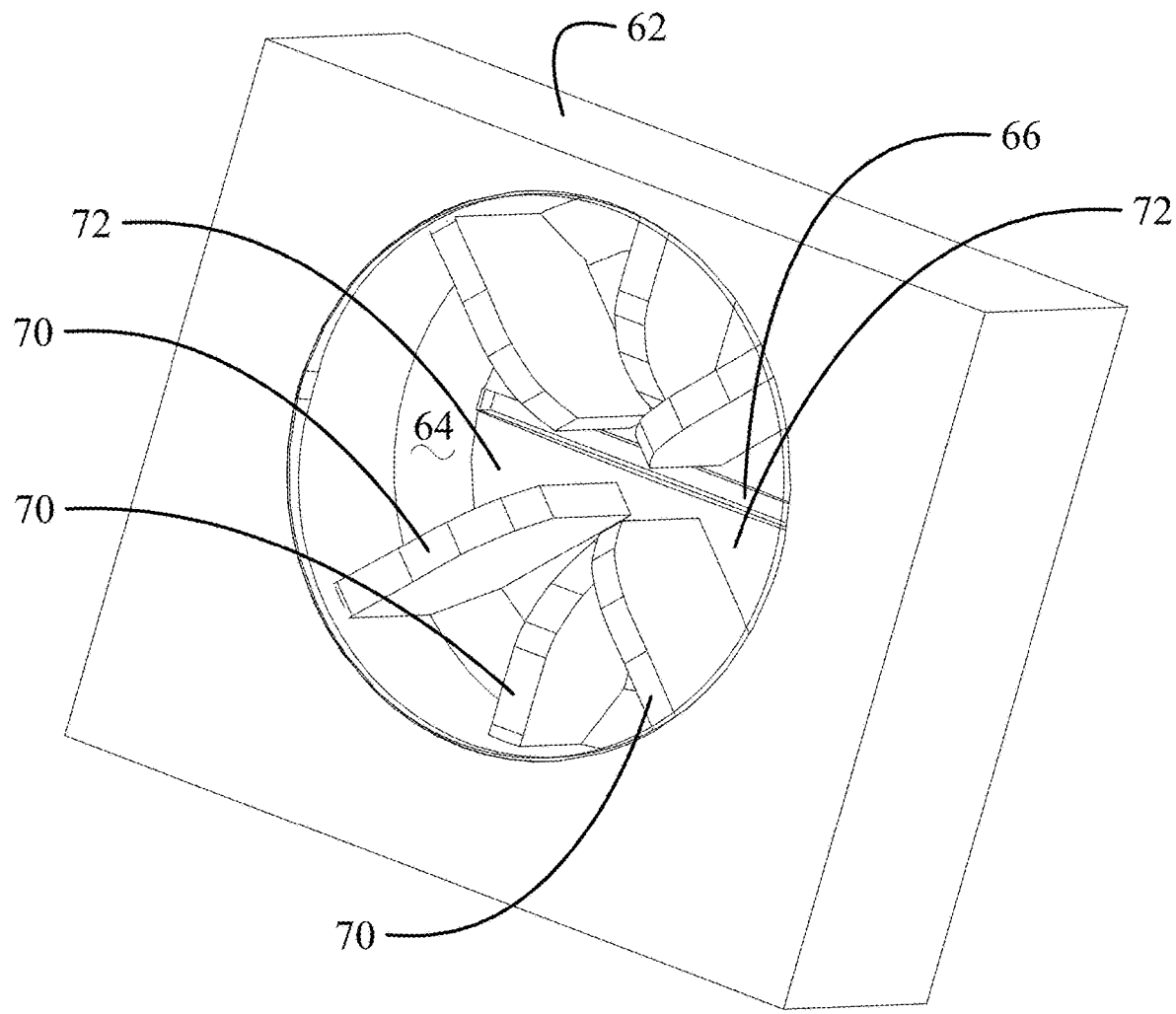
FIG. 10B is a pictorial representation of support elements in a 3D printed assembly of the structural embodiment of FIG. 10A; and, FIG. 11 is a flow chart of a method for creating a synthetic jet.

An acoustic cavity tailored synthetic jet as described for the embodiments above may be fabricated using additive manufacturing (3D printing) techniques. As seen in FIG. 10A, a jet body 62, which may be rectangular as shown or cylindrical, is additively printed to incorporate a cavity 64 having a tapering wall 68 from a first extent 69 and terminating in a slotted aperture 66. The cavity 64 may be configured as described for the embodiments above. To allow minimal wall thickness for the cavity, radial support struts 70, as seen in FIG. 10B with the cavity wall 68 removed for clarity, may be printed over the cavity wall to provide sufficient rigidity while providing empty volumes 72 within the structure of the body 62 for reduced weight and material savings.

Example 1

In testing of the acoustic cavity tailored synthetic jet fabricated as described above, measured normalized velocity and normalized total momentum for the for the exemplary cavity shapes defined in FIGS. 9A and 9C is shown in Table 2. The data identifies an increase in normalized measured total momentum of over a factor of 3 demonstrating the efficacy of the tapered cavity having a varying slope.

TABLE 2

| Cavity shape | Normalized Velocity | normalized total momentum |
|---|---|---|
| FIG. 9A | .57 | .30 |
| FIG. 9C | 1.0 | 1.0 |

Figure 11:
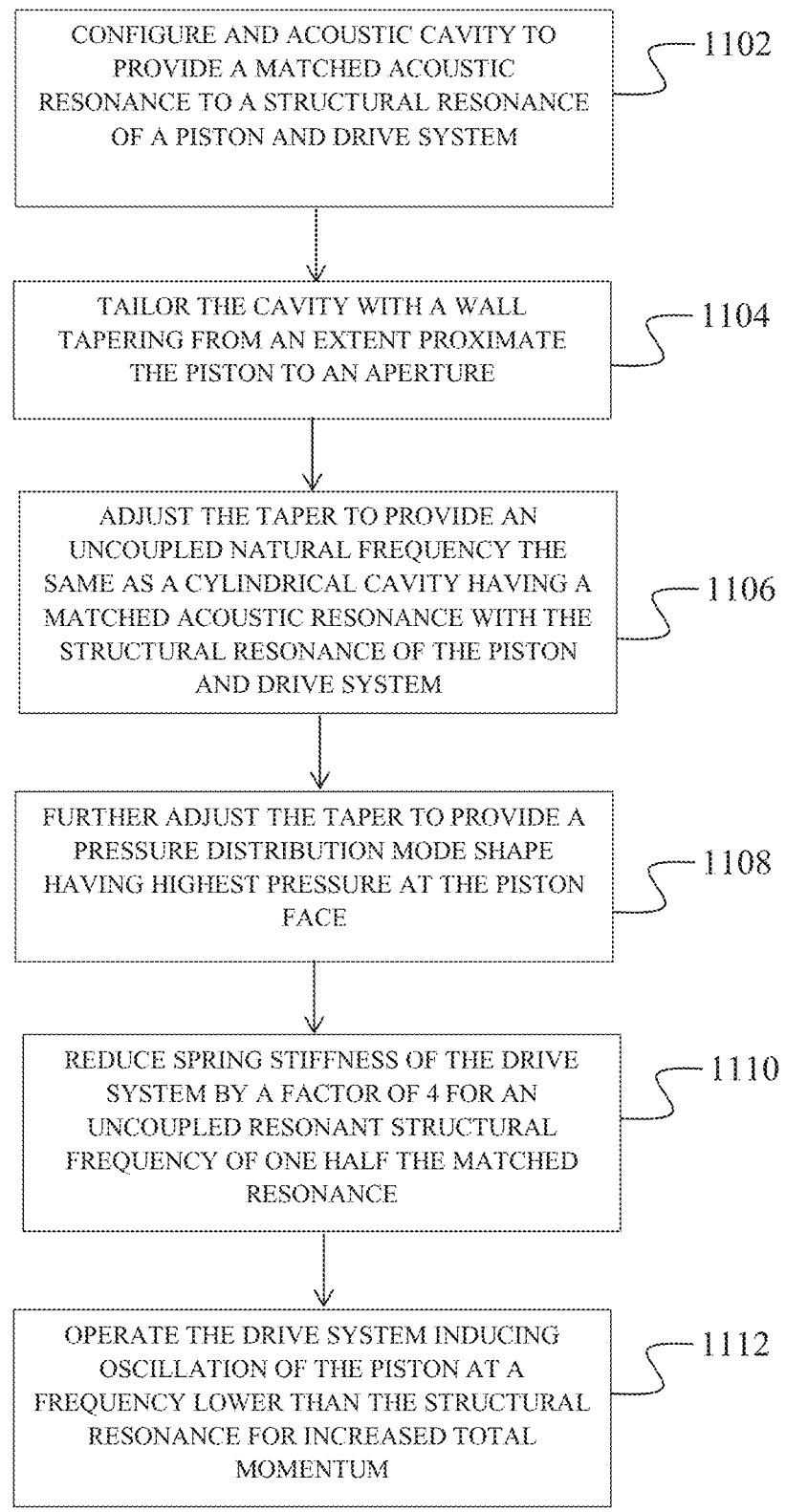

The embodiments disclosed provide a method for producing a synthetic jet as shown in FIG. 11. An acoustic cavity 24, 54 is configured to provide a matched acoustic resonance to a structural resonance of a piston 30 and drive system 32, step 1102, and is tailored with a wall 40, 60 tapering from an extent 42, 58 of the cavity proximate to the piston to an aperture 26,56, step 1104. The taper is adjusted by varying the slope of the wall as previously described to provide an uncoupled natural frequency the same as a cylindrical cavity having a matched acoustic resonance with the structural resonance of the piston and drive system, step 1106. The slope of the taper is then further adjusted to provide a pressure distribution mode shape having highest pressure at the piston face, step 1108. Spring stiffness of the drive system 32 is reduced by a factor of 4 for an uncoupled resonant structural frequency of one half the matched resonance, step 1110, and the drive system 32 is operated inducing oscillation of the piston, step 1112, at a frequency lower than the structural resonance for increased total momentum.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An acoustic cavity tailored synthetic jet comprising:
a body having a cavity with a wall having a taper from a first extent to an aperture with a shape of the taper being a polynomial of at least second order thereby having a varying slope characterized by a polynomial of at least first order, the cavity having an acoustic resonant frequency;
a drive system having a piston engaged to the cavity at the first extent, said drive system and piston configured for oscillatory motion inducing a synthetic jet at the aperture, the drive system having a structural resonant frequency less than the acoustic resonant frequency and the drive system and piston configured for an uncoupled resonant frequency of one half the acoustic resonant frequency;
wherein the drive system incorporates a forcing element and a spring, said spring having stiffness reduced by a factor of 4 from a stiffness for an uncoupled resonant frequency equal to the acoustic resonance, said forcing element inducing oscillation of the piston at a frequency lower than the structural resonance for increased total momentum.

2. The acoustic cavity tailored synthetic jet as defined in claim 1 wherein the taper is characterized as producing the same uncoupled natural frequency as a cylindrical cavity with an acoustic mode shape pressure distribution having highest concentration at the piston.

3. The acoustic cavity tailored synthetic jet as defined in claim 1 wherein the shape of the taper is $y=5.167x^4-7.413x^3+4.680x^2-1544x+0.00422$ with a Y axis parallel with a lateral axis of the cavity and an X axis perpendicular to the Y axis.

4. The acoustic cavity tailored synthetic jet as defined in claim 1 wherein the aperture comprises a slot.

5. The acoustic cavity tailored synthetic jet as defined in claim 1 wherein the aperture comprises a circular hole and the cavity is symmetrical about a normal axis to a center of the circular hole.

6. The acoustic cavity tailored synthetic jet as defined in claim wherein the varying slope increases from the extent to the aperture.

7. A method for producing a synthetic jet comprising:
configuring a body with a cavity having an acoustic resonant frequency;
configuring a drive system having a piston engaged to the cavity at a first extent, said drive system and piston configured for oscillatory motion and the drive system having a structural resonant frequency less than the acoustic resonant frequency, and the drive system and piston having an uncoupled resonant frequency of one half the acoustic resonant frequency, wherein the drive system incorporates a forcing element and a spring, said spring having stiffness reduced by a factor of 4 from a stiffness for an uncoupled resonant frequency equal to the acoustic resonance;
tailoring the cavity with a wall tapering from the first extent of the cavity proximate to the piston to an aperture, with a shape of the taper being a polynomial of at least second order and a varying slope characterized by a polynomial of at least first order; and
operating the drive system to induce oscillation of the piston at a frequency less than the structural resonance inducing a synthetic jet at the aperture with increased momentum.

8. The method as defined in claim 7 wherein varying the slope comprises progressively increasing the slope of the taper of the wall from the extent to the aperture.

9. The method as defined in claim 8 wherein varying the slope comprises varying the slope of the taper of the wall to match uncoupled natural frequency of a cylindrical cavity and adjusting the slope to provide an acoustic mode shape pressure distribution having highest concentration at the extent proximate the piston.

10. The method as defined in claim 7 wherein the step of tailoring the cavity further comprises tailoring the cavity with a wall tapering from the first extent of the cavity proximate to the piston to a slot as the aperture.

11. The method as defined in claim 7 wherein the step of tailoring the cavity further comprises tailoring the cavity with a wall tapering from the first extent of the cavity proximate to the piston to a circular aperture.

12. The method as defined in claim 7 wherein the step of tailoring the cavity further comprises tailoring the cavity with a wall tapering from the first extent of the cavity proximate to the aperture with the shape of the taper being $y=5.167x^4-7.413x^3+4.680x^2-1544x+0.00422$ with a Y axis parallel with a lateral axis of the cavity and an X axis perpendicular to the Y axis.

* * * * *